United States Patent
Bolz et al.

(10) Patent No.: US 12,450,357 B2
(45) Date of Patent: Oct. 21, 2025

(54) METHOD FOR BOOTING AN ELECTRONIC DEVICE

(71) Applicant: Robert Bosch GmbH, Stuttgart (DE)

(72) Inventors: Peter Bolz, Markgroeningen (DE); Stefan Trittler, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/001,555

(22) PCT Filed: Jul. 14, 2021

(86) PCT No.: PCT/EP2021/069581
§ 371 (c)(1),
(2) Date: Dec. 12, 2022

(87) PCT Pub. No.: WO2022/053205
PCT Pub. Date: Mar. 17, 2022

(65) Prior Publication Data
US 2023/0244789 A1    Aug. 3, 2023

(30) Foreign Application Priority Data
Sep. 10, 2020   (DE) .............. 10 2020 211 346.7

(51) Int. Cl.
*G06F 21/57*    (2013.01)
*G06F 21/86*    (2013.01)

(52) U.S. Cl.
CPC ............ *G06F 21/575* (2013.01); *G06F 21/86* (2013.01)

(58) Field of Classification Search
CPC ...... G06F 21/575; G06F 21/86; G06F 21/572; G06F 21/64; G06F 21/71
See application file for complete search history.

(56) References Cited

U.S. PATENT DOCUMENTS

| | | | |
|---|---|---|---|
| 7,380,136 B2* | 5/2008 | Zimmer | H04L 9/0825 713/193 |
| 8,474,021 B2* | 6/2013 | Hearn | G06F 21/575 171/82 |
| 10,915,634 B2* | 2/2021 | Rhelimi | G06F 21/77 |
| 11,086,997 B1* | 8/2021 | Stephenson | H04L 9/088 |
| 11,212,087 B2* | 12/2021 | Takemori | H04L 9/3242 |
| 2003/0014663 A1* | 1/2003 | Sormunen | G06F 21/575 713/164 |

(Continued)

FOREIGN PATENT DOCUMENTS

| | | |
|---|---|---|
| JP | 2014021953 A | 2/2014 |
| JP | 2019191698 A | 10/2019 |

OTHER PUBLICATIONS

International Search Report for PCT/EP2021/069581, Issued Oct. 22, 2021.

(Continued)

*Primary Examiner* — Faisal M Zaman
(74) *Attorney, Agent, or Firm* — NORTON ROSE FULBRIGHT US LLP

(57) ABSTRACT

A method for booting an electronic device. The method includes: booting a first activation apparatus secured against tampering; and booting, with a time-defined overlap, at least one further activation apparatus secured against tampering, which is configured to activate a computer program product of the electronic device.

9 Claims, 2 Drawing Sheets

(56) References Cited

U.S. PATENT DOCUMENTS

| | | | |
|---|---|---|---|
| 2004/0107358 A1* | 6/2004 | Shiakallis | G06F 21/34 726/9 |
| 2007/0192610 A1* | 8/2007 | Chun | G06F 21/575 713/176 |
| 2008/0189539 A1* | 8/2008 | Hsu | G06F 21/575 713/2 |
| 2012/0185683 A1* | 7/2012 | Krstic | G06F 21/44 713/193 |
| 2014/0281575 A1* | 9/2014 | Springfield | G06F 21/72 713/189 |
| 2016/0125187 A1 | 5/2016 | Oxford | |
| 2016/0154700 A1* | 6/2016 | Tian | G06F 11/1469 714/15 |
| 2017/0111177 A1* | 4/2017 | Oguma | H04L 9/3273 |
| 2017/0140151 A1* | 5/2017 | Nelson | G06F 9/4403 |
| 2018/0018461 A1* | 1/2018 | Shin | G06F 21/602 |
| 2018/0157841 A1* | 6/2018 | Shin | G06F 21/44 |
| 2019/0129493 A1* | 5/2019 | Li | G06F 15/7817 |
| 2019/0392151 A1* | 12/2019 | Lee | G06F 21/575 |
| 2020/0050799 A1* | 2/2020 | Yamada | G06F 21/78 |
| 2020/0074083 A1* | 3/2020 | Hou | G06F 11/1417 |
| 2020/0175169 A1* | 6/2020 | Pillilli | G06F 9/4401 |
| 2020/0184067 A1* | 6/2020 | Kanai | G06F 21/64 |
| 2020/0184077 A1* | 6/2020 | Venkataraman | G06F 21/575 |
| 2020/0213287 A1 | 7/2020 | Zhang et al. | |
| 2020/0342112 A1* | 10/2020 | Plusquellic | G06F 21/602 |
| 2021/0011734 A1* | 1/2021 | Dang | H04L 9/088 |
| 2021/0019417 A1* | 1/2021 | Zeh | G06F 21/572 |
| 2021/0037060 A1* | 2/2021 | Robison | H04L 63/123 |
| 2021/0240833 A1* | 8/2021 | Bae | G06F 21/572 |
| 2021/0263746 A1* | 8/2021 | Thom | G06F 3/0685 |
| 2021/0312051 A1* | 10/2021 | Kloth | G06F 9/4406 |
| 2022/0004639 A1* | 1/2022 | Yardi | G06F 3/017 |
| 2022/0069988 A1* | 3/2022 | Ong | H04L 9/0861 |
| 2023/0073884 A1* | 3/2023 | Farrell | G06F 21/54 |

OTHER PUBLICATIONS

Soja, "Automotive Security: From Standards To Implementation," Automotive Microcontrollers and Processors, NXP, FREESCALE. COM, 2014, pp. 1-18. <https://www.nxp.com/docs/en/white-paper/AUTOSECURI%20TYWP.pdf>.

* cited by examiner

METHOD FOR BOOTING AN ELECTRONIC DEVICE

FIELD

The present invention relates to a method for booting an electronic device. The present invention further relates to an electronic device. The present invention further relates to a computer program product.

BACKGROUND INFORMATION

Electronic devices are increasingly susceptible to undesired malicious and well-intentioned tampering. As electronic devices have become increasingly networked (primarily over the internet), however, these threats have taken on new dimensions, and data theft can also be a serious threat. This issue affects any devices, primarily networked electrical and electronic devices (e.g., also the Internet of Things), and now particularly affects the automotive industry. Attacks on the electronic devices with the aim of tampering with them aim in particular to modify software and/or configurations of the electronic devices. In this case, configurations can be expressed in data sets and also by software being present or absent.

Conventional modern microcontrollers provide the option of configuring areas of the program memory (flash memory) to be unmodifiable via hardware mechanisms after programming. This equates to the behavior of a one-time-programmable (OTP) memory.

Also conventional is the option of protecting the program memory (flash memory) with a hardware password such that the program memory can be reprogrammed or reflashed only when the hardware password has been entered previously. Many conventional, newer automotive microcontrollers have program memories (flash memories) with OTP and hardware-password functionality for memory protection.

In addition, it is conventional that hardware passwords can be assigned in a device-specific manner. In order to make it harder for attacks to be made on whole device product lines, hardware passwords are generally assigned in a device-specific manner and specifically such that one hardware password cannot be deduced from another hardware password of the device product line, for example by using random numbers or cryptographic key derivation functions.

SUMMARY

An object of the present invention is to provide an improved, in particular more secure, method for booting an electronic device.

According to a first aspect of the present invention, the object may be achieved by a method for booting an electronic device. According to an example embodiment of the present invention, the method comprises the following steps:
  booting a first activation apparatus secured against tampering; and
  booting, with a time-defined overlap, at least one further activation apparatus secured against tampering, which is configured to activate a computer program product of the electronic device.

This facilitates a rapid and secure booting process of the electronic device. This is achieved in that both activation apparatuses can be booted in a secure manner. This is achieved in that, for the two activation apparatuses, concurrent secure booting is provided by way of write protection.

As a result, this facilitates a "secure upward boot chain:" If one of the further computer program products were tampered with (for example, caused by a hacker attack in the field), this situation would be identified by the first or second activation apparatus, as a result of which the first and/or second further computer program product would not be booted by the first and/or second activation apparatus.

Advantageously, this provides security against undesired activation of program code that has been tampered with in an undesired manner.

As a result, in field operation, the provided method according to the present invention can thus prevent program code from being tampered with in an undesired manner. Advantageously, the electronic device can be rapidly booted from two secure sources in the form of the two tamper-proof activation apparatuses. In the context of the present invention, "tamper-proof" is understood to mean that program code of the two activation apparatuses cannot be modified.

According to a second aspect of the present invention, the object may achieved by an electronic device. According to an example embodiment of the present invention, the electronic device comprises:
  a first activation apparatus secured against tampering; and
  at least one further activation apparatus secured against tampering, which is bootable with a time-defined overlap with the first activation apparatus and is configured to activate at least one computer program product of the electronic device.

According to a third aspect of the present invention, the object may be achieved by a computer program comprising program code configured for carrying out the proposed method when it is run on a proposed electronic device or is stored on a computer-readable data medium.

Advantageous developments and embodiments of the present invention are disclosed herein.

An advantageous development of the method of the present invention provides that the first activation apparatus and the second activation apparatus are booted simultaneously. This implements a particularly preferred overlap range of the booting of the two activation apparatuses. Advantageously, this facilitates the two activation apparatuses being activated as time-efficiently as possible.

A further advantageous development of the method of the present invention provides that the second activation apparatus initiates a checking functionality of the first activation apparatus for checking the further computer program product and wherein the first activation apparatus provides the checking functionality for checking the computer program product. Advantageously, this makes it possible to efficiently verify whether the further computer program product has been tampered with in an undesired manner.

A further advantageous development of the electronic device of the present invention provides that the second activation apparatus is secured against tampering by a hardware protection apparatus. This means that the second activation apparatus can access the hardware protection apparatus only by way of a hardware password. In addition, this is not required for actually activating the further computer program product, but only for reprogramming at the factory. For example, the hardware password can be stored in a flash memory of the second activation apparatus.

Advantageously, the hardware password can be provided so as to be specific to each electronic device. For example, this can be carried out in IT trust centers, in which a password is generated and stored for each electronic device in a device-specific manner. This provides all the electronic devices with maximum protection against undesired tampering of software and/or data.

A further advantageous development of the electronic device of the present invention provides that the second activation apparatus is secured against tampering by one-time programming of the second activation apparatus. As a result, the second activation apparatus is advantageously secured against tampering in an alternative manner. For example, this can be implemented by electronic fuses being irreparably destroyed or blown.

A further advantageous development of the electronic device of the present invention provides that the first activation apparatus is a hardware security module. This module is in particular characterized in that only the hardware security module has access to its own flash memory, meaning that there is a high level of security against tampering.

A further advantageous development of the electronic device of the present invention provides that, for each electronic device, an individual password is provided for the hardware protection apparatus. Advantageously, this provides a high level of security against tampering for the electronic device.

A further advantageous development of the electronic device of the present invention provides that the hardware password is required for deactivating the hardware protection apparatus. Advantageously, this also provides a high level of security against tampering for the electronic device.

A further advantageous development of the electronic device of the present invention provides that the two activation apparatuses and the computer program products are arranged on the same chip. This provides an efficiently operating on-chip solution for the electronic device.

The present invention is described in detail below on the basis of two figures in conjunction with further features and advantages. The figures are primarily intended to illustrate the main features of the present invention.

Method features that are disclosed analogously result from corresponding device features that are disclosed, and vice versa. In particular, this means that features, technical advantages, and configurations relating to the proposed method for booting an electronic device result in an analogous manner from corresponding configurations, features, and advantages relating to the electronic device, and vice versa.

DETAILED DESCRIPTION OF EXAMPLE EMBODIMENTS

Figure 1:
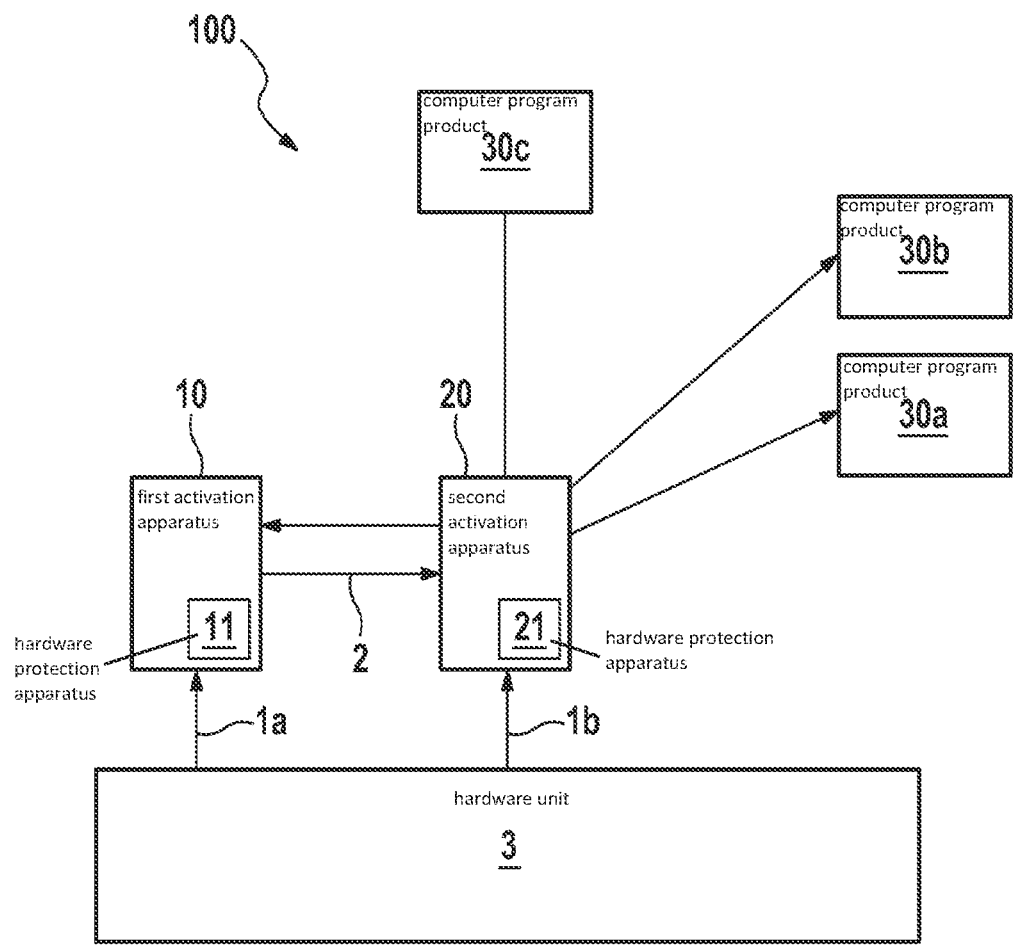
FIG. 1 is a schematic system diagram showing a mode of action of a device and a method according to an example embodiment of the present invention.

One measure to combat the above-mentioned tampering can, for example, involve verifying the integrity and authenticity of software before it is launched. If the integrity and authenticity are in order, the software is launched, but if they are not, it is not launched. If this method is applied to software from the moment that the device is switched on for the software that is launched first and for subsequently launched software, this is known as "secure boot" of a device, which is conventional.

The time period for verifying the integrity and/or authenticity of software to be activated may be too long for many applications. The device function would be available too late, even in the event of an unexpected reboot. Therefore, there is also the method of activating the software without checking it to begin with and only checking the software thereafter, concurrently with the runtime. If it is identified that the software has been tampered with, on the basis of this information that software can be prevented from being reactivated the next time the device is started up.

This conventional method is referred to as "authentic boot," and it has several variants. Both secure boot and authentic boot can be applied in a staggered and mixed manner; in mixed forms, authentic boot should follow secure boot, and not the other way around.

In many electronic devices, the software that is launched first after power-on is a boot manager, which selects and activates the software still to be launched depending on certain conditions. The software that is activated thereafter can in turn have boot-manager or boot-loader functionality or can be functional in the sense of actual device functionality. Boot managers are often very small and simple software units which are also intended to be executed rapidly.

In order to implement secure boot for a device comprising software, the booting of the device has to be launched from a secure source and, as described above, should first be verified using cryptographic means before further software is activated. A boot manager can automatically carry out the cryptographic verification of a piece of software to be launched when the required information regarding the software to be launched is available (e.g., occupied address range and information regarding the available reference check data, with the boot manager also being able to use hardware security module services (see below)).

To securely store security material, i.e., to store security material such that it cannot be tampered with or attacked, or such that it is very difficult to do so, in order to make it possible to securely store, process, and transmit, for example, tamper-proof digital root certificates and/or effective root certificates, public keys, secret keys, or other secret data, so-called hardware security modules (HSMs) are described, for example in Klaus Schmeh, Kryptographie (Verfahren, Protokolle, Infrastrukturen) (Cryptography (Methods, Protocols, Infrastructures)), dpunkt Verlag, 6$^{th}$ edition, April 2016.

In some current families of microcontrollers, a hardware security module is used which is implemented as an on-chip unit comprising its own processor, its own exclusive memory areas for executable program code (stored in a program flash memory), non-volatile data (stored in a data flash memory, for example), code and volatile data (e.g., RAM), hardware accelerators for cryptographic algorithms, etc. The hardware security module is configured as an on-chip co-processor to the main processor. The main processor, which is normally larger, and its on-chip environment are referred to in the following as the "host". The host thus also accommodates the smaller hardware security module on the same chip.

Secure boot functionalities implemented using or on the basis of a hardware security module are conventional. In this case, before being used in a training phase, a cryptographic hash, for example, is calculated in the hardware security module via the software to be protected and is securely stored in the hardware security module. During the secure boot phase, the hash is used to verify the software.

As a starting point for secure boot of the hardware security module itself, part of the hardware security module software, as software in the hardware security module co-processor, is defined as so-called "secure anchor software". In secure boot, this anchor software of the hardware security module launches after power-on and then activates further hardware security module software with corresponding secure boot verification, and then activates further software outside the hardware security module, with secure boot or authentic boot verification.

A secure boot process, in which the hardware security module itself is checked first and the host boot manager is checked thereafter, takes longer than booting both processors concurrently because of the sequential approach.

According to an example embodiment of the present invention, it is provided that the host boot manager be launched immediately after power-on. As a result, valuable time can be gained until the system becomes available, for example a few to several tens of milliseconds. It is provided that hardware memory protection be used together with a hardware password for the program code of the host boot manager in order to implement the host boot manager on the host as a root of trust for a secure boot or authentic boot process but to still remain flexible in terms of reprogramming. In this case, the host boot manager can boot without requiring permission from the hardware security module. As a result, the host boot manager and the hardware security module can boot concurrently in this way, and this can result in valuable time being gained in the boot process.

Consequently, the hardware password for removing the hardware protection for the host boot manager is known to the chip hardware (and is stored in the hardware as a comparative value for received data for removing the hardware protection), but not to the software on the chip, i.e., neither to the software on the host nor to the software on the hardware security module. Required or desired reprogramming of the hardware of the host boot manager is enabled where required (e.g., at the factory, IT trust center, etc.) by providing the hardware password. As a result, rapid booting of the host is thus facilitated without secure boot by the hardware security module, with a secure root of trust being provided for secure booting or activation of the host software.

The hardware password can be assigned by the device manufacturer, for example in a device-specific manner; it is incorporated in the hardware of the chip and activated while the device is being manufactured and can be stored in a secure IT infrastructure (e.g., an IT trust center) outside the newly manufactured device together with device identification data.

In order to deactivate the hardware protection for the host boot manager, before the reprogramming process the hardware password first has to be transmitted to the hardware of the host boot manager. The reprogramming apparatus, arranged outside the device, only obtains the hardware password following authentication to the secure IT infrastructure of the apparatus, which can take place at the factory manufacturing the device, for example.

Therefore, during manufacture there is nothing to prevent desired and permitted reprogramming of devices which are currently being stored (semi-finished or already finished and ready for shipping) but which still need to be reprogrammed in order to incorporate newer functions (in this case, for the host boot manager), or for returned devices, which are reprogrammed for the purpose of analysis, or devices removed for quality checks.

In order for it to be possible to reprogram the host boot manager in the field, the password specific to the control unit has to be known to the original equipment manufacturer (OEM) and the OEM has to use it when reprogramming the host boot manager. To do this, the hardware passwords of a series of secure machine-to-machine (M2M) interfaces should expediently be sent from the device-manufacturer trust center to the OEM trust center, which then relays them to the testers in the workshops during the reprogramming, again in a manner specific to the control unit.

FIG. 1 is a schematic system diagram showing a mode of action of the provided method and the provided electronic device 100.

It shows the electronic device 100 comprising a hardware unit 3, for example in the form of a microcontroller. The electronic device 100 further comprises a first activation apparatus 10 in the form of a hardware security module and a second activation apparatus 20 in the form of a host boot manager. The first activation apparatus 10 is secured against tampering, for example by a hardware protection apparatus 21, which is generally already provided as part of a microcontroller implementation of the first activation apparatus 10. In addition, this figure shows further computer program products 30*a* . . . 30*c*, which are activated by the second activation apparatus 20 and run on the hardware unit 3 after they have been activated.

In a step 1*a*, the first activation apparatus 10 is booted or activated by way of its boot area. A boot area (not shown) of the first activation apparatus 10 is protected against tampering by a hardware protection apparatus 11. As a result, booting the first activation apparatus 10 is therefore secure in the sense of a root of trust.

The second activation apparatus 20 is booted in a step 1*b* with a time-defined overlap, preferably at the same time as the first activation apparatus 10 is activated in step 1*a*, the hardware (e.g., a flash memory) of which second activation apparatus is protected by a hardware protection apparatus 21, and therefore the hardware of the second activation apparatus 20 cannot be reprogrammed without the hardware protection apparatus 21. Preferably, a hardware password is required for deactivating a protection function of the hardware protection apparatus 21. Alternatively, the second activation apparatus 20 can be secured against tampering by one-time programming of the hardware of the second activation apparatus 20; however, in this case, it is not possible to reprogram the second activation apparatus 20.

The first activation apparatus 10 is provided to activate a further computer program product (not shown). This further computer program product may also be part of the first activation apparatus 10. The second activation apparatus 20 is provided to activate a further computer program product 30*a* . . . 30*c*. As a result, the two activation apparatuses 10, 20 are used to facilitate a defined, tamper-proof activation chain and both have a root of trust, meaning that computer program products 11, 30*a* . . . 30*c* that have been tampered with in an undesired manner are prevented from being activated as far as possible.

In the course of the concurrent booting of the activation apparatuses 10, 20, when the second activation apparatus 20 requests it from the first activation apparatus 10, a checking functionality or verification services of the first activation apparatus 10 is used 2 by the second activation apparatus 20. As a result, the first activation apparatus 10 checks the integrity of the further computer program product 30*a*, 30*b*, 30*c* before it is used, whereupon the second activation apparatus 20 activates or boots one of the further computer program products 30*a*, 30*b*, 30*c*. In the process, the computer program product 30*a*, or the computer program product 30*b*, or the computer program product 30*c* is activated or booted.

All the above-mentioned boot processes can be carried out either by secure boot or authentic boot processes, which are conventional, or by a mixed form of the processes. If it is established during this check that one of the further computer program products 30a, 30b, 30c has been tampered with in an undesired manner, the second activation apparatus 20 does not activate the computer program product 30a, 30b, 30c that has been tampered with in an undesired manner.

As a result, this therefore makes it possible to rapidly and securely start up or boot the electronic device 100 (e.g., in the form of an electronic control unit of a motor vehicle). For example, the electronic control unit may be a radar control unit of a motor vehicle.

Advantageously, owing to the security against tampering provided by the two activation apparatuses 10, 20, the electronic device 100 is also efficiently protected against being actively tampered with in an undesired manner during field operation.

Although the proposed method has been disclosed above as using two activation apparatuses 10, 20, it goes without saying that this proposed method can also be carried out using more than two activation apparatuses.

Figure 2:
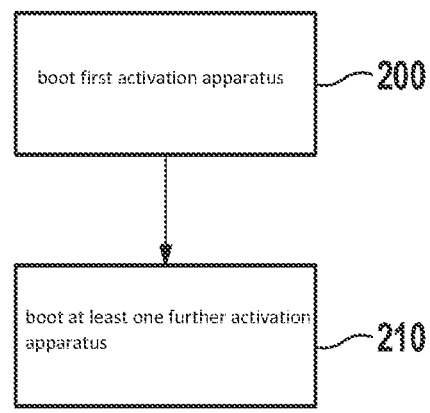
FIG. 2 is a schematic flow diagram of a method for booting an electronic device, according to an example embodiment of the present invention.

FIG. 2 shows a schematic sequence of a proposed method for booting an electronic device 100.

In a step 200, a first activation apparatus 10 secured against tampering is booted.

In a step 210, at least one further activation apparatus 20 secured against tampering, which is configured to activate a computer program product 30a . . . 30c of the electronic device 100, is booted with a time-defined overlap.

The two method steps 200, 210 are thus performed with a time-defined overlap, and are preferably performed simultaneously, at the same time, or concurrently.

Advantageously, the proposed method can be implemented in the form of a software program having suitable program code for the electronic device 100. This makes it simple to adapt the method.

Advantageously, the electronic device 100 can be used for an electronic control unit, in particular in the automotive sector, the electronic control unit comprising a microcontroller having a programmable program memory.

A person skilled in the art would thus modify and/or combine the features of the present invention in a suitable manner without departing from the core concept of the present invention.

What is claimed is:

1. A method for booting an electronic device that includes a first hardware component and a second hardware component, the method comprising the following steps:
   booting the first hardware component, the first hardware component having a hardware security module and a respective hardware protection apparatus that secures the first hardware component against tampering;
   booting, independently of the booting of the first hardware component and independently of the hardware security module, the second hardware component, the second hardware component having (a) a host boot manager that is launched (i) by the booting of the second hardware component and (ii) independently of the booting of the first hardware component and (b) a respective hardware protection apparatus that secures the second hardware component against tampering;
   wherein:
      the booting of the first hardware component is initiated independently of the booting of the second hardware component and includes loading and executing a first boot code from a non-volatile memory that is exclusively addressable by the hardware security module;
      the booting of the second hardware component includes loading and executing of a second boot code from a non-volatile memory that is independently addressable by the host boot manager;
      a booting time period over which the booting of the first hardware component occurs and a booting time period over which the booting of the second hardware component occurs overlap in time; and
      after the host boot manager has been launched:
         the host boot manager of the second hardware component requesting via an inter-component communication link, for each of one or more computer programs, the hardware security module of the first hardware component to authenticate the respective computer program;
         the hardware security module of the first hardware component performing, for the each of the one or more computer programs, the respective requested authentication of the respective computer program; and
         the host boot manager loading and executing the one or more of the computer programs responsive to the one or more of the computer programs having been authenticated by the hardware security module, the one or more of the computer programs being activated into a running state by the loading and executing.

2. An electronic device, comprising:
a first hardware component that has a respective hardware security module and has a respective hardware protection apparatus that secures the first hardware component against tampering; and
a second hardware component:
   has a respective hardware protection apparatus that is secures the second hardware component against tampering;
   is bootable and whose booting occurs (a) independently of a booting of the first hardware component and independently of the hardware security module and (b) over a respective booting period that overlaps in time with a respective time period over which the booting of the first hardware component occurs; and
   has a host boot manager that is launched by the booting of the second hardware component and independently of the booting of the first hardware component;
wherein:
   the booting of the first hardware component is initiated independently of the booting of the second hardware component and includes loading and executing a first boot code from a non-volatile memory that is exclusively addressable by the hardware security module;
   the booting of the second hardware component includes loading and executing of a second boot code from a non-volatile memory that is independently addressable by the host boot manager; and
   after the host boot manager has been launched:
      the host boot manager of the second hardware component is configured to request via an inter-component communication link, for each of one or more computer programs, the hardware security module of the first hardware component to authenticate the respective computer program;
      the hardware security module of the first hardware component is configured to perform, for the each of the one or more computer programs, the respective requested authentication of the respective computer program; and the host boot manager is configured to load and execute the one or more computer programs responsive to the one or more of the computer programs having been authenticated by the hardware security module of the first hardware component, the one or more computer programs being activated into a running state by the loading and executing.

3. The electronic device as recited in claim 2, wherein the second hardware component is secured against tampering by a hardware protection apparatus.

4. The electronic device as recited in claim 2, wherein the second hardware component is secured against tampering by one-time programming of the second hardware component.

5. The electronic device as recited in claim 3, wherein an individual password is provided for each of the first and second hardware protection apparatuses.

6. The electronic device as recited in claim 5, wherein the hardware password is required for deactivating the hardware protection apparatus.

7. The electronic device as recited in claim 2, wherein the first and second hardware components and the computer program are arranged on the same chip.

8. The electronic device as recited in claim 2, wherein the electronic device is configured to operate an electronic control unit in an automotive sector.

9. Non-transitory computer-readable data media on which are stored program code for an electronic device, the program code, when executed by the electronic device that has a first hardware component and a second hardware component, causing the electronic device to perform the following steps:

booting the first hardware component, the first hardware component having a hardware security module and a respective hardware protection apparatus that secures the first hardware component against tampering;

booting, independently of the booting of the first hardware component and independently of the hardware security module, the second hardware component, the second hardware component having (a) a host boot manager that is launched (i) by the booting of the second hardware component and (ii) independently of the booting of the first hardware component and (b) a respective hardware protection apparatus that secures the second hardware component against tampering;

wherein:

the booting of the first hardware component is initiated independently of the booting of the second hardware component and includes loading and executing a first boot code from a non-volatile memory that is exclusively addressable by the hardware security module;

the booting of the second hardware component includes loading and executing of a second boot code from a non-volatile memory that is independently addressable by the host boot manager;

a booting time period over which the booting of the first hardware component occurs and a booting time period over which the booting of the second hardware component occurs overlap in time; and after the host boot manager has been launched:

the host boot manager of the second hardware component requesting via an inter-component communication link, for each of one or more computer programs, the hardware security module of the first hardware component to authenticate the respective computer program;

the hardware security module of the first hardware component performing, for the each of the one or more computer programs, the respective requested authentication of the respective computer program; and the host boot manager loading and executing the one or more of the computer programs responsive to the one or more of the computer programs having been authenticated by the hardware security module, the one or more of the computer programs being activated into a running state by the loading and executing.

* * * * *